(12) United States Patent
Deaton

(10) Patent No.: US 6,474,611 B1
(45) Date of Patent: Nov. 5, 2002

(54) DEVICE FOR HOLDING A CONTAINER ADJACENT TO A VEHICULAR VENT

(76) Inventor: Michael C. Deaton, 18 Sabina La., Santa Fe, NM (US) 87505

( * ) Notice: Subject to any disclaimer, the term of this patent is extended or adjusted under 35 U.S.C. 154(b) by 0 days.

(21) Appl. No.: 09/765,462

(22) Filed: Jan. 22, 2001

(51) Int. Cl.[7] .............................. A47K 1/08; F28F 7/00
(52) U.S. Cl. .................. 248/311.2; 248/313; 165/80.1; 165/41
(58) Field of Search .............................. 248/311.2, 215, 248/304, 305, 314, 315; 224/926; 165/80.1, 41

(56) References Cited

U.S. PATENT DOCUMENTS

| | | | |
|---|---|---|---|
| 4,779,831 A | | 10/1988 | Anderson |
| 4,784,360 A | | 11/1988 | Mok |
| 4,852,843 A | | 8/1989 | Chandler |
| 4,892,137 A | * | 1/1990 | Bibik, Jr. .................. 165/80.1 |
| 5,012,654 A | * | 5/1991 | Gatti ........................... 62/244 |
| 5,092,395 A | * | 3/1992 | Amidzich .................... 165/41 |
| D326,359 S | | 5/1992 | Friend |
| 5,421,289 A | * | 6/1995 | Capellaro .................... 119/18 |
| 5,445,350 A | * | 8/1995 | Rigsby ........................ 248/313 |
| 5,540,409 A | | 7/1996 | Cunningham |
| 5,593,124 A | * | 1/1997 | Wang .................... 248/231.81 |
| 5,865,411 A | | 2/1999 | Droste et al. |
| 5,961,083 A | * | 10/1999 | Hartmann et al. ..... 248/222.14 |

* cited by examiner

Primary Examiner—Anita King

(57) ABSTRACT

A device for holding a container adjacent to a vehicular vent for allowing air expelled from the vent to either heat or cool the container. The device for holding a container adjacent to a vehicular vent includes a first annular member for removably receiving a container. The annular member has an inner surface and an outer surface. A plurality of flanges is integrally coupled to the inner surface of the annular member and extends toward a central portion of the annular member. A first coupler removably couples the first annular member to slats of a vehicular vent. The first coupler comprises a first and second tubular member. Each of the first and second tubular members is elongate and has a first end and a second end. A bar is integrally coupled to each of the second ends of the first and second tubular members such that the first and second tubular members are spaced from each other and extend away from the bar in a generally parallel direction with respect to each other. Each of a first pair of shafts extend outwardly away from one of the first and second tubular members and has a hook portion thereon for removably engaging the slats. The first annular member extends between and is integrally coupled to the first and second tubular members. The first annular member is positioned in a plane defined by the first and second tubular members and the bar coupled to the first and second tubular members.

5 Claims, 3 Drawing Sheets

US 6,474,611 B1

DEVICE FOR HOLDING A CONTAINER ADJACENT TO A VEHICULAR VENT

BACKGROUND OF THE INVENTION

1. Field of the Invention

The present invention relates to vehicle container holding devices and more particularly pertains to a new device for holding a container adjacent to a vehicular vent for allowing air expelled from the vent to either heat or cool the container.

2. Description of the Prior Art

The use of vehicle container holding devices is known in the prior art. More specifically, vehicle container holding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,852,843; 5,540,409; 4,779,831; 4,784,360; 5,865,411; U.S. Des. Pat. No. 326,359.

While these devices fulfill their respective, particular objectives and requirements, the aforementioned patents do not disclose a new device for holding a container adjacent to a vehicular vent. The inventive device includes a first annular member for removably receiving a container. The annular member has an inner surface and an outer surface. A plurality of flanges is integrally coupled to the inner surface of the annular member and extends toward a central portion of the annular member. A first coupler removably couples the first annular member to slats of a vehicular vent. The first coupler comprises a first and second tubular member. Each of the first and second tubular members is elongate and has a first end and a second end. A bar is integrally coupled to each of the second ends of the first and second tubular members such that the first and second tubular members are spaced from each other and extend away from the bar in a generally parallel direction with respect to each other. Each of a first pair of shafts extend outwardly away from one of the first and second tubular members and has a hook portion thereon for removably engaging the slats. The first annular member extends between and is integrally coupled to the first and second tubular members. The first annular member is positioned in a plane defined by the first and second tubular members and the bar coupled to the first and second tubular members.

In these respects, the device for holding a container adjacent to a vehicular vent according to the present invention substantially departs from the conventional concepts and designs of the prior art, and in so doing provides an apparatus primarily developed for the purpose of allowing air expelled from the vent to either heat or cool the container.

SUMMARY OF THE INVENTION

In view of the foregoing disadvantages inherent in the known types of vehicle container holding devices now present in the prior art, the present invention provides a new device for holding a container adjacent to a vehicular vent construction wherein the same can be utilized for allowing air expelled from the vent to either heat or cool the container.

The general purpose of the present invention, which will be described subsequently in greater detail, is to provide a new device for holding a container adjacent to a vehicular vent apparatus and method which has many of the advantages of the vehicle container holding devices mentioned heretofore and many novel features that result in a new device for holding a container adjacent to a vehicular vent which is not anticipated, rendered obvious, suggested, or even implied by any of the prior art vehicle container holding devices, either alone or in any combination thereof.

To attain this, the present invention generally comprises a first annular member for removably receiving a container. The annular member has an inner surface and an outer surface. A plurality of flanges is integrally coupled to the inner surface of the annular member and extends toward a central portion of the annular member. A first coupler removably couples the first annular member to slats of a vehicular vent. The first coupler comprises a first and second tubular member. Each of the first and second tubular members is elongate and has a first end and a second end. A bar is integrally coupled to each of the second ends of the first and second tubular members such that the first and second tubular members are spaced from each other and extend away from the bar in a generally parallel direction with respect to each other. Each of a first pair of shafts extend outwardly away from one of the first and second tubular members and has a hook portion thereon for removably engaging the slats. The first annular member extends between and is integrally coupled to the first and second tubular members. The first annular member is positioned in a plane defined by the first and second tubular members and the bar coupled to the first and second tubular members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new device for holding a container adjacent to a vehicular vent apparatus and method which has many of the advantages of the vehicle container holding devices mentioned heretofore and many novel features that result in a new device for holding a container adjacent to a vehicular vent which is not anticipated, rendered obvious, suggested, or even implied by any of the prior art vehicle container holding devices, either alone or in any combination thereof.

It is another object of the present invention to provide a new device for holding a container adjacent to a vehicular vent which may be easily and efficiently manufactured and marketed.

It is a further object of the present invention to provide a new device for holding a container adjacent to a vehicular vent which is of a durable and reliable construction.

An even further object of the present invention is to provide a new device for holding a container adjacent to a vehicular vent which is susceptible of a low cost of manufacture with regard to both materials and labor, and which accordingly is then susceptible of low prices of sale to the consuming public, thereby making such device for holding a container adjacent to a vehicular vent economically available to the buying public.

Still yet another object of the present invention is to provide a new device for holding a container adjacent to a vehicular vent which provides in the apparatuses and methods of the prior art some of the advantages thereof, while simultaneously overcoming some of the disadvantages normally associated therewith.

Still another object of the present invention is to provide a new device for holding a container adjacent to a vehicular vent for allowing air expelled from the vent to either heat or cool the container.

Yet another object of the present invention is to provide a new device for holding a container adjacent to a vehicular vent which includes a first annular member for removably receiving a container. The annular member has an inner surface and an outer surface. A plurality of flanges is integrally coupled to the inner surface of the annular member and extends toward a central portion of the annular member. A first coupler removably couples the first annular member to slats of a vehicular vent. The first coupler comprises a first and second tubular member. Each of the first and second tubular members is elongate and has a first end and a second end. A bar is integrally coupled to each of the second ends of the first and second tubular members such that the first and second tubular members are spaced from each other and extend away from the bar in a generally parallel direction with respect to each other. Each of a first pair of shafts extend outwardly away from one of the first and second tubular members and has a hook portion thereon for removably engaging the slats. The first annular member extends between and is integrally coupled to the first and second tubular members. The first annular member is positioned in a plane defined by the first and second tubular members and the bar coupled to the first and second tubular members.

Still yet another object of the present invention is to provide a new device for holding a container adjacent to a vehicular vent that has biasing members for pulling the device towards the vent for added stability.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
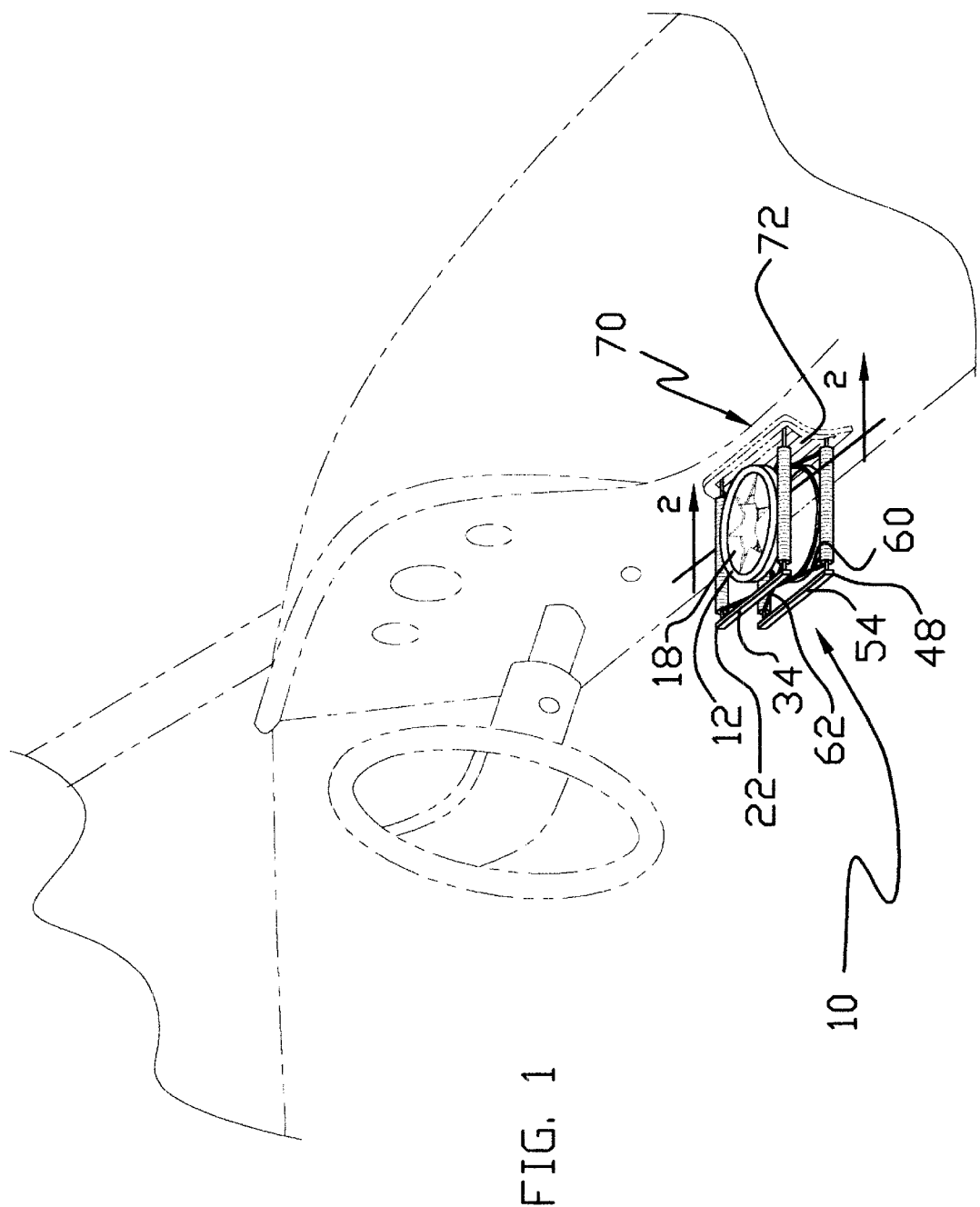
FIG. 1 is a schematic perspective view of a new device for holding a container adjacent to a vehicular vent according to the present invention.
Figure 2:
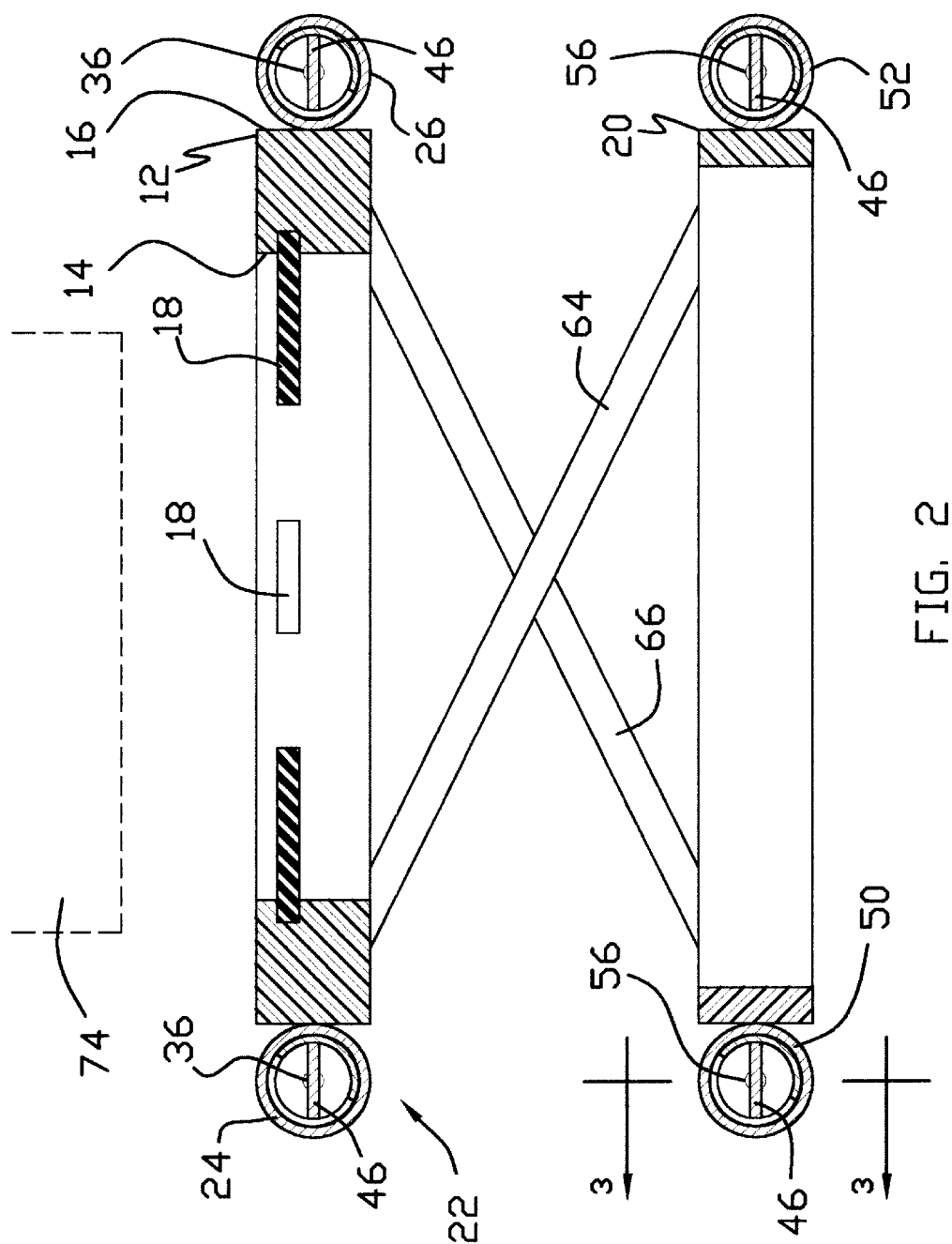
FIG. 2 is a schematic cross-sectional view taken along line 2—2 of the present invention.
Figure 3:
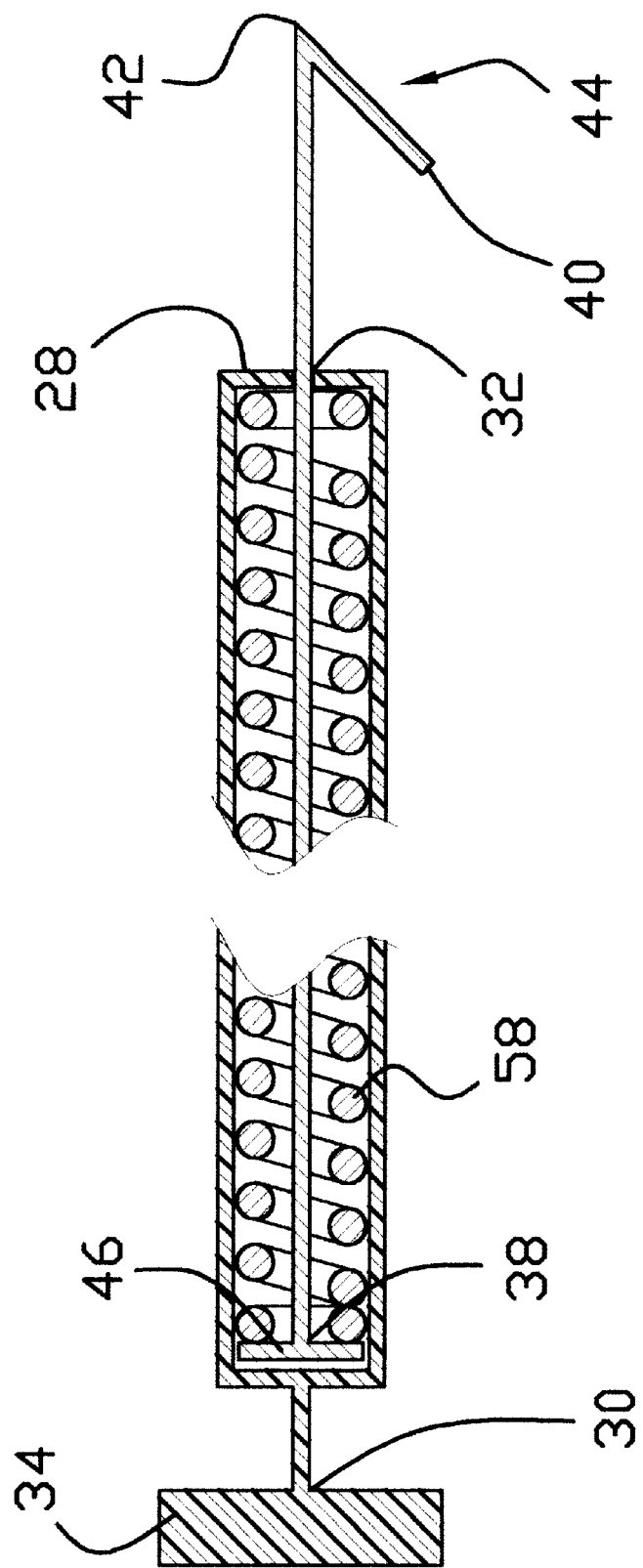
FIG. 3 is a schematic cross-sectional view taken along line 3—3 of the present invention.

With reference now to the drawings, and in particular to FIGS. 1 through 3 thereof, a new device for holding a container adjacent to a vehicular vent embodying the principles and concepts of the present invention and generally designated by the reference numeral 10 will be described.

As best illustrated in FIGS. 1 through 3, the device 10 for holding a container adjacent to a vehicular vent generally comprises a device for coupling to slats 70 in a vehicle vent 72 such that a conventional beverage container is positioned generally adjacent to the vent. The device 10 includes a first annular member 12 for removably receiving the container 74. The annular member 12 has an inner surface 14 and an outer surface 16. A plurality of flanges 18 is integrally coupled to the inner surface 14 of the annular member 12 and extends toward a central portion of the annular member 12. Each of the flanges 18 comprises an elastomeric material. A second annular member 20 removably also receives the container.

A first coupler 22 removably couples the first annular member 12 to the slats 70. The first coupler 22 includes a first 24 and second 26 tubular member. Each of the first 24 and second 26 tubular members are elongate and has a first end 28 and a second end 30. Each of the first ends 28 has an opening 32 therein.

A bar 34 is integrally coupled to each of the second ends 30 of the first 24 and second 26 tubular members such that the first and second tubular members are spaced from each other and extend away from the bar 34 in a generally parallel direction with respect to each other.

Each of a first pair of shafts 36 has a first end 38 and a second end 40. Each of the first pair shafts 36 has a bend 42 therein positioned nearer the second end 40 than the first end 38 such that hooks 44 are defined between the bends 42 and the second ends 40. Each of the first ends 38 of the first pair of shafts 36 has a plate 46 thereon. Each of the first ends 38 of the first pair shafts 36 is positioned in one of the first 24 and second 26 tubular members such that the shafts 36 extend outwardly of the first ends of the first and second tubular members. Each of the hooks 44 is removably coupled to the slats 70.

The first annular member 12 extends between and is integrally coupled to the first 24 and second 26 tubular members. The first annular member 12 is positioned in a plane defined by the first 24 and second 26 tubular members and the bar 34 coupled to the first and second tubular members.

A second coupler 48 removably couples the second annular member 20 to the slats 72. The second coupler 48 includes a third 50 and fourth 52 tubular member. Each of the third 50 and fourth 52 tubular members is elongate and has a first end 28 and a second end 30. Each of the first ends 28 has an opening 32 therein.

A bar 54 is integrally coupled to each of the second ends 28 of the third 50 and fourth 52 tubular members such that the third 50 and fourth 52 tubular members are spaced from each other and extend away from the bar 54 in a generally parallel direction with respect to each other.

Each of a second pair of shafts 56 has a first end 38 and a second end 40. Each of the second pair shafts 56 has a bend 42 therein positioned nearer the second end 40 than the first end 38 such that hooks 44 are defined between the bends and the second 20 ends. Each of the first ends 38 of the second pair of shafts 56 has a plate 46 thereon. Each of the first ends 38 of the second pair shafts is positioned in one of the third 50 and fourth 52 tubular members such that the shafts 56 extend outwardly of the first ends 28 of the third 50 and fourth 52 tubular members. Each of the hooks 44 is removably coupled to the slats 72.

The second annular member 20 extends between and is integrally coupled to the third 50 and fourth 52 tubular members.

The second annular member 20 is positioned in a plane defined by the third 50 and fourth 52 tubular members and the bar 54 coupled to the third 50 and fourth 52 tubular members.

A plurality of biasing members 58 bias the plates 46 toward the second ends 30 of the tubular members 24, 26, 50, 52. Each of the biasing members 58 comprises a spring positioned in one of the tubular members and located between the first ends 28 of the tubular members and one of the plates 46. When the hooks 44 are positioned on the slats 72 the springs pull the tubular members toward the slats 72 for greater stability such that the couplers 22, 48 remain substantially horizontal.

A plurality of supports support the first 22 and second 48 couplers in a spaced relationship from each other and retaining a generally coaxial relationship between the first and second annular members. The first tubular member 24 is positioned over the second tubular member 50 and the second tubular 26 member is positioned over the fourth tubular member 52. A first 60 of the supports extends between and is integrally coupled to the first 24 and fourth 52 tubular members and positioned generally adjacent to the bars 34, 54. A second 62 of the supports extends between and is integrally coupled to the second 26 and third 50 tubular members and positioned generally adjacent to the bars. A third 64 of the supports extends between and is integrally coupled to the first 24 and fourth 52 tubular members and positioned generally adjacent to the first ends 28 of the tubular members. A fourth 66 of the supports extends between and is integrally coupled to the second 26 and third 50 tubular members and positioned generally adjacent to the first ends 28 of the tubular members.

In use, the hooks 44 are positioned over the slats 72 to hold the couplers 22, 48 to the vent 72. A beverage container may be positioned in the annular members 12, 20 such that air being forced out of the vents 70 may either cool or warm the container.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A beverage container holding device for coupling to slats in a vehicle vent such that said container is positioned generally adjacent to the vent, said device comprising:

a first annular member for removably receiving the container, said annular member having a inner surface and an outer surface, a plurality of flanges being integrally coupled to said inner surface of said annular member and extending toward a central portion of said annular member;

a first coupler for removably coupling said first annular member to said slats, said first coupler comprising;

a first and second tubular member, each of said first and second tubular members being elongate and having a first end and a second end;

a bar being integrally coupled to each of said second ends of said first and second tubular members such that said first and second tubular members are spaced from each other and extend away from said bar in a generally parallel direction with respect to each other; and a first pair of shafts, each of said first pair of shafts extending outwardly away from one of said first and second tubular members and having a hook portion thereon for removably engaging said slats, said first annular member extending between and being integrally coupled to said first and second tubular members, said first annular member being positioned in a plane defined by said first and second tubular members and said bar coupled to said first and second tubular members.

2. The beverage container holding device as in claim 1, wherein said device further includes:

each of said first ends of said first and second tubular members having an opening therein;

each of said first pair of shafts having a first end and a second end, each of said first pair shafts having a bend therein positioned nearer said second end than said first end such that hooks are defined between said bends and said second ends, each of said first ends of said first pair of shafts having a plate thereon, each of said first ends of said first pair shafts being positioned in one of said first and second tubular members such that said shafts extend outwardly of said first ends of said first and second tubular members; and a plurality of biasing members for biasing said plates toward said first ends of said tubular members, each of said biasing members comprising a spring positioned in one of said tubular members and located between said first ends of said tubular members and one of said plates.

3. The beverage container holding device as in claim 1, further including:

a second annular member for removably receiving the container;

a second coupler for removably coupling said second annular member to said slats, said second coupler comprising;

third and fourth tubular members, each of said third and fourth tubular members being elongate and having a first end and a second end;

a second bar being integrally coupled to each of said second ends of said third and fourth tubular members such that said third and fourth tubular members are spaced from each other and extend away from said bar in a generally parallel direction with respect to each other;

a second pair of shafts, each of said second pair of shafts extending outwardly away from one of said third and fourth tubular members and having a hook portion thereon for removably engaging said slats, said second annular member extending between and being integrally coupled to said third and fourth tubular members, said second annular member being positioned in a plane defined by said third and fourth tubular members and said bar coupled to said third and fourth tubular members;

a plurality of supports for supporting said first and second couplers in a spaced relationship from each other and retaining a generally coaxial relationship between said first and second annular members.

4. The beverage container holding device as in claim 3, wherein said first tubular member is positioned over said second tubular member and said third tubular member is positioned over said fourth tubular member, a first of said supports extending between and being integrally coupled to said first and fourth tubular members and positioned generally adjacent to said first and second bars, a second of said supports extending between and being integrally coupled to said second and third tubular members and positioned generally adjacent to said first and second bars, a third of said supports extending between and being integrally coupled to said first and fourth tubular members and positioned generally adjacent to said first ends of said tubular members, a fourth of said supports extending between and being integrally coupled to said second and third tubular members and positioned generally adjacent to said first ends of said tubular members.

5. A beverage container holding device for coupling to slats in a vehicle vent such that said container is positioned generally adjacent to the vent, said device comprising:

a first annular member for removably receiving the container, said annular member having a inner surface and an outer surface, a plurality of flanges being integrally coupled to said inner surface of said annular member and extending toward a central portion of said annular member, each of said flanges comprising an elastomeric material;

a second annular member for removably receiving the container;

a first coupler for removably coupling said first annular member to said slats, said first coupler comprising;

first and second tubular members, each of said first and second tubular members being elongate and having a first end and a second end, each of said first ends having an opening therein;

a first bar being integrally coupled to each of said second ends of said first and second tubular members such that said first and second tubular members are spaced from each other and extend away from said bar in a generally parallel direction with respect to each other;

a first pair of shafts, each of said first pair of shafts having a first end and a second end, each of said first pair shafts having a bend therein positioned nearer said second end than said first end such that hooks are defined between said bends and said second ends, each of said first ends of said first pair of shafts having a plate thereon, each of said first ends of said first pair shafts being positioned in one of said first and second tubular members such that said shafts extend outwardly of said first ends of said first and second tubular members, each of said hooks being removably coupled to said slats;

said first annular member extending between and being integrally coupled to said first and second tubular members, said first annular member being positioned in a plane defined by said first and second tubular members and said bar coupled to said first and second tubular members;

a second coupler for removably coupling said second annular member to said slats, said second coupler comprising;

third and fourth tubular members, each of said third and fourth tubular members being elongate and having a first end and a second end, each of said first ends having an opening therein;

a second bar being integrally coupled to each of said second ends of said third and fourth tubular members such that said third and fourth tubular members are spaced from each other and extend away from said bar in a generally parallel direction with respect to each other;

a second pair of shafts, each of said second pair of shafts having a first end and a second end, each of said second pair shafts having a bend therein positioned nearer said second end than said first end such that hooks are defined between said bends and said second ends, each of said first ends of said second pair of shafts having a plate thereon, each of said first ends of said second pair shafts being positioned in one of said third and fourth tubular members such that said shafts extend outwardly of said first ends of said third and fourth tubular members, each of said hooks being removably coupled to said slats;

said second annular member extending between and being integrally coupled to said third and fourth tubular members, said second annular member being positioned in a plane defined by said third and fourth tubular members and said bar coupled to said third and fourth tubular members;

a plurality of biasing members for biasing said plates toward said first ends of said tubular members, each of said biasing members comprising a spring positioned in one of said tubular member and located between said first ends of said tubular members and one of said plates;

a plurality of supports for supporting said first and second couplers in a spaced relationship from each other and retaining a generally coaxial relationship between said first and second annular members, wherein said first tubular member is positioned over said second tubular member and said third tubular member is positioned over said fourth tubular member, a first of said supports extending between and being integrally coupled to said first and fourth tubular members and positioned generally adjacent to said first and second bars, a second of said supports extending between and being integrally coupled to said second and third tubular members and positioned generally adjacent to said first and second bars, a third of said supports extending between and being integrally coupled to said first and fourth tubular members and positioned generally adjacent to said first ends of said tubular members, a fourth of said supports extending between and being integrally coupled to said second and third tubular members and positioned generally adjacent to said first ends of said tubular members.

* * * * *